H. G. INGRAM.
CHERRY SEEDER.
APPLICATION FILED SEPT. 2, 1911.
1,039,750.
Patented Oct. 1, 1912.
2 SHEETS—SHEET 1.
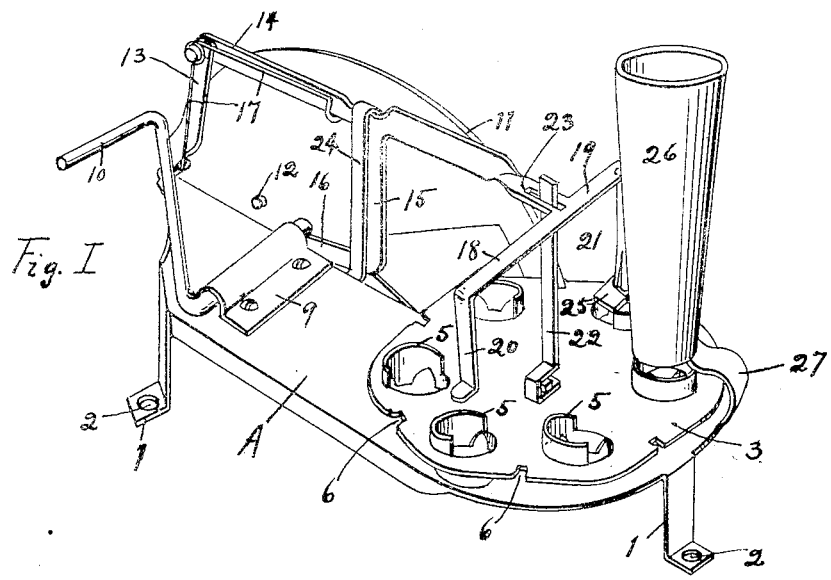
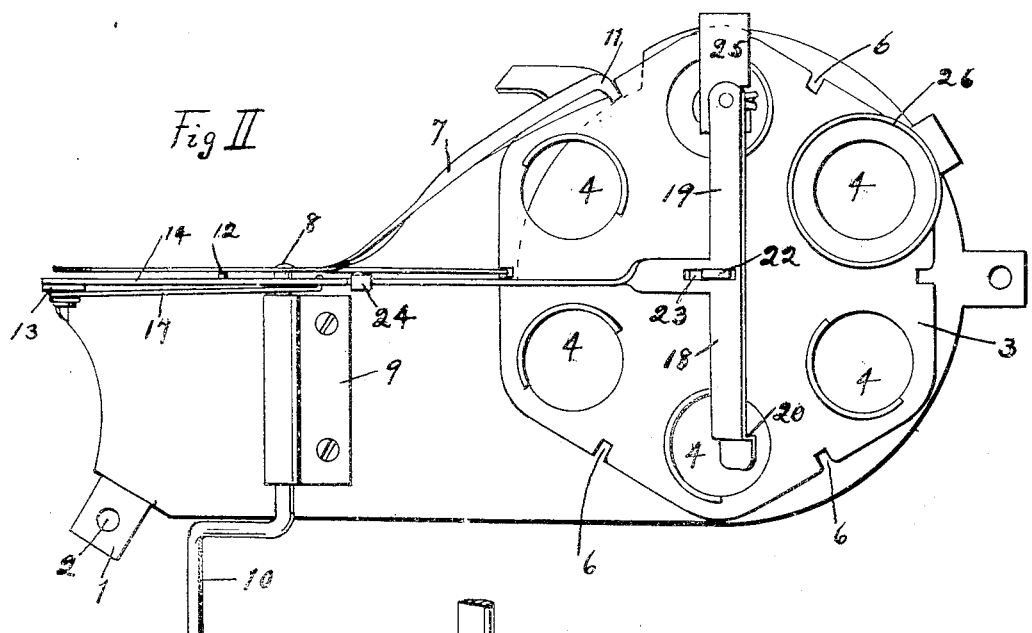
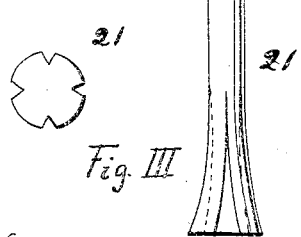
Horace G. Ingram
Inventor
By
Chas. H. Morgan
Attorney
Witnesses
Lellis Byrne.
Lulu Cunningham.

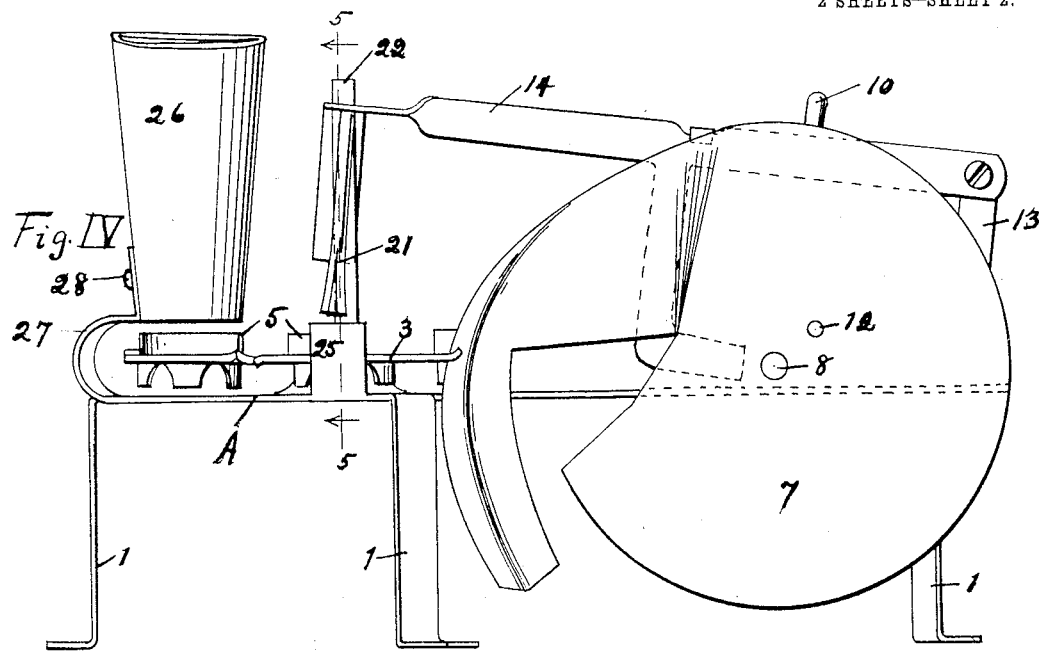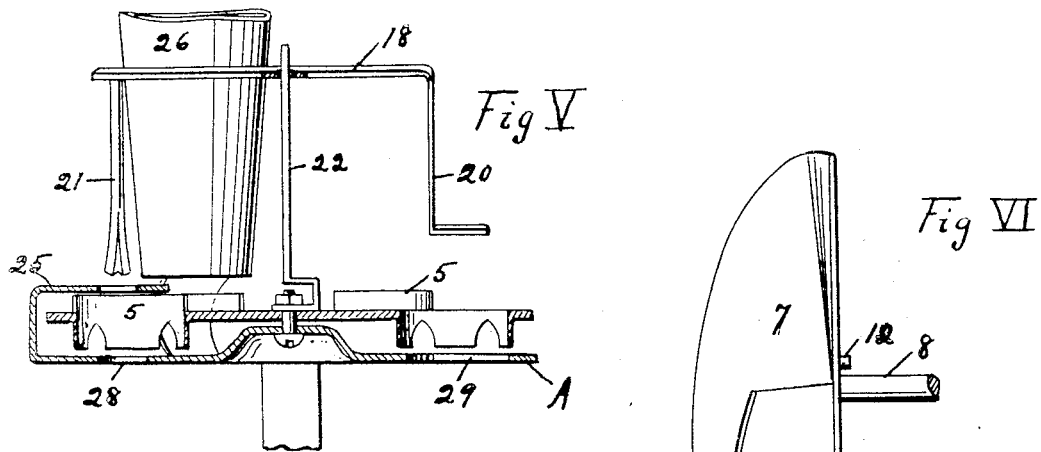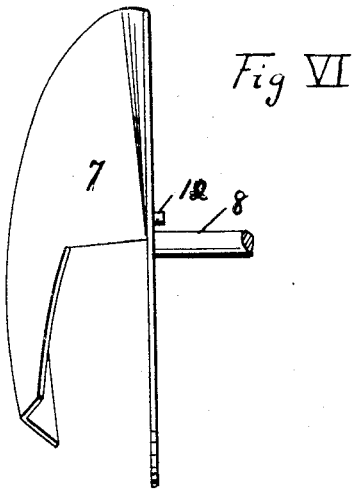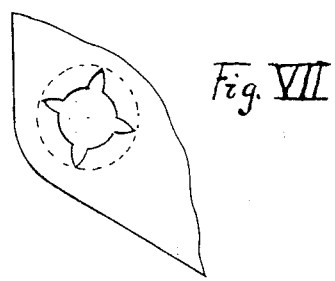

UNITED STATES PATENT OFFICE.

HORACE G. INGRAM, OF JUNIATA, PENNSYLVANIA, ASSIGNOR OF ONE-HALF TO SAMUEL GOLDBERG, OF ALTOONA, PENNSYLVANIA.

CHERRY-SEEDER.

1,039,750. Specification of Letters Patent. Patented Oct. 1, 1912.

Application filed September 2, 1911. Serial No. 647,402.

*To all whom it may concern:*

Be it known that I, HORACE G. INGRAM, a citizen of the United States, residing at Juniata, in the county of Blair and State of Pennsylvania, have invented new and useful Improvements for Cherry-Seeders, of which the following is a specification.

The object of my invention is to provide a new and improved apparatus for seeding cherries or other like fruit by means of which the shape of the fruit is preserved while the seed is extracted.

With this and other objects in view my invention consists of the combination and arrangement of parts shown in the accompanying drawings, in which—

Figure 1 is a perspective view of the seeder complete. Fig. 2 is a plan view. Fig. 3 is a detail of one form of punch for extracting the seed. Fig. 4 is a side view of the seeder. Fig. 5 is a view on line "5—5" of Fig. 4 partly in section, and in the direction of the arrows. Fig. 6 is an end view of the cam for operating the disk of the seeder. Fig. 7 is a detail showing the opening through which the punch passes.

Similar letters and figures refer to similar parts throughout the drawings.

My invention consists of a base "A" having supporting legs, which may have openings "2" for securing it to a table or other support. Upon this base "A" is pivoted a disk "3" having openings "4—4" for receiving the fruit. These openings "4—4" have collars "5—5" secured in them so that the fruit will be readily moved along without mashing or mutilating it. The collars "5" are so placed in the openings "4," that the widest part is always in the rear of the direction of movement of the fruit. The disk "3" has also notches "6—6" spaced at regular distances, so that the disk can be moved intermittently by means of a cam "7." The cam "7" is fastened to a pivot "8," which is secured in a bearing "9" and operated by a crank "10." The cam "7" has a curved edge "11," which is so arranged that it engages the slot "6," and moves the disk "3" a given distance during a complete revolution of the cam. In this instance the cam "7" moves the disk "3" through sixty degrees of the circle. This can be varied, however, if the size of the disk "3" is increased or decreased.

The punching mechanism consists of a standard "13" secured to the base "A." At the upper end of this stem "13" is pivoted an arm "14." This arm extends forward over the disk "3." It is normally held upward by means of a spring "17," which has a coil about the pivot on the arm "14." Near the middle of the arm "14" is a downwardly extending lug "15" whose lower end is bent backward forming an inclined surface on the end "16." This surface is engaged by a pin "12" on the cam "7," which presses it downwardly a uniform distance during every revolution of the cam. At the forward end of the arm "14" is a cross arm "18—19." The end "18" is curved downwardly and outwardly as shown at "20," and the end "19" has a punch "21" fastened to it. This punch also extends downwardly at right-angles to the arm, and passes through an opening in a plate "25," which extends over the disk "3," and has the openings centrally placed over the circle of the openings "4" in the disk "3." The arm "14" also has a slot "23" cut in this forward end, through which an upwardly extending post "22" passes and acts as a guide for the forward end of the arm. This directs the punch, and the downwardly extending arm "20" in their proper places. Fastened to the base "A" is an upwardly extending arm "27," to which is fastened a hopper "26," by means of a screw "28." This upwardly extending arm "27" may have a slot cut in it so as to make the hopper adjustable in order to bring it closer to the disk "3," or farther away from it when the size of the fruit changes. A stop "24" is attached to the base "A," and has its upper end curved downwardly, so as to extend over the arm "14," and limit its upward movement.

From this description it will readily be seen that the operation of the device is as follows: The operator grasps the crank "10" and drops fruit in the hopper, thus by turning the crank the cam "7" is rotated, which in turn through the curved face "11," rotates the disk "3" by engaging one of the notches "6." This brings the fruit under the punching mechanism, and by means of pin "12," which engages the upper surface of arm "16," the punch is depressed through the opening of the plate "25," and passes through the center of the fruit in the opening "4" of the disk. This engages the seed of the fruit and pushes it through the opening "28" in the bottom of the base "A." The fruit is held in place by reason of the fact, that it is considerable larger than the opening "28," and when the crank is turned and the disk partly rotated, the fruit is passed along until it reaches the opposite side of the base "A." At this point an opening "29" is formed, which is substantially the same size as openings "4" of the disk "3." If the fruit does not readily drop out in to the receptacle through this opening, the curved end of the arm "20" pushes it through, when the punching mechanism is depressed. This arm "20" is called an ejector. Any form of punch that is suitable for the fruit to be seeded may be used, and the openings through which it is passed, and through which the seed passes are accordingly modified.

What I claim is—

1. In a cherry seeder the combination of a base, a hopper for containing fruit, a punching mechanism for extracting the seed from the fruit consisting of a spring pressed arm having a punch and fruit ejector mounted on its end, a rotatable disk with openings for conveying the fruit from the hopper to the punching mechanism, a hole in said base through which the fruit is ejected, a pivoted cam rotatably held in said base, notches in said disk to be engaged by said cam for automatically rotating it a given distance, and a pin on said cam for automatically operating said punching mechanism.

2. In a cherry seeder the combination of a base, a hopper, a rotatable disk having openings therein for receiving the fruit, said rotatable disk being pivoted on the base, a cam for automatically operating said disk, a punching mechanism consisting of a spring pressed arm having a punch mounted on its end, and operated at regular intervals, holes in the base for dropping the seed and fruit respectively, and means on said punching mechanism for forcing the fruit through said opening, so as to automatically clear the disk and a pin mounted in said cam and adapted to operate said spring pressed arm.

3. In a cherry seeder, the combination of a base, a hopper, a punching mechanism consisting of a spring pressed arm having a punch and fruit ejector mounted in its end, a rotatable disk for conveying the fruit from the hopper to the punching mechanism, a cam for automatically operating the disk, a pin in said cam for operating said spring pressed arm, a guide passing through the forward end of the arm, and secured to the base for insuring the centering of the punch and the ejector.

4. In a cherry seeder the combination of a base, a rotatable disk for carrying the fruit mounted on said base, notches in said disk at regular intervals, a cam rotatably mounted on an axis at right angles to said disk on the base and shaped so as to intermittently rotate said disk by engaging the notches, a spring pressed arm normally held in a raised position and means on said cam for intermittently engaging and depressing said arm, substantially as described.

HORACE G. INGRAM.

Witnesses:
ARTHUR T. BUKE,
EDITH H. RUSSELL.